Oct. 9, 1951 J. J. DILKS 2,570,652
PICTURE DISK VIEWING PROJECTOR
Filed May 4, 1949 3 Sheets-Sheet 1
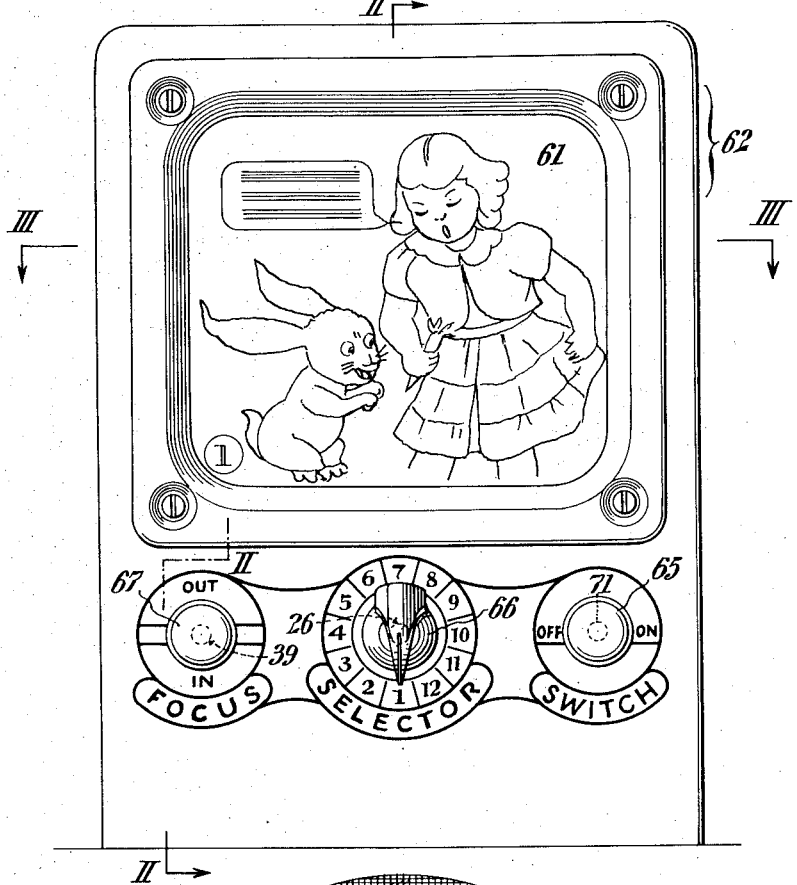
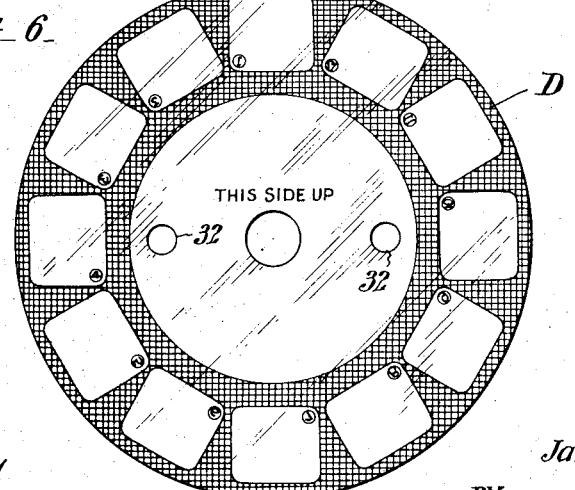
WITNESSES
INVENTOR:
James J. Dilks,
BY
ATTORNEYS.

Oct. 9, 1951 J. J. DILKS 2,570,652
PICTURE DISK VIEWING PROJECTOR
Filed May 4, 1949 3 Sheets-Sheet 2
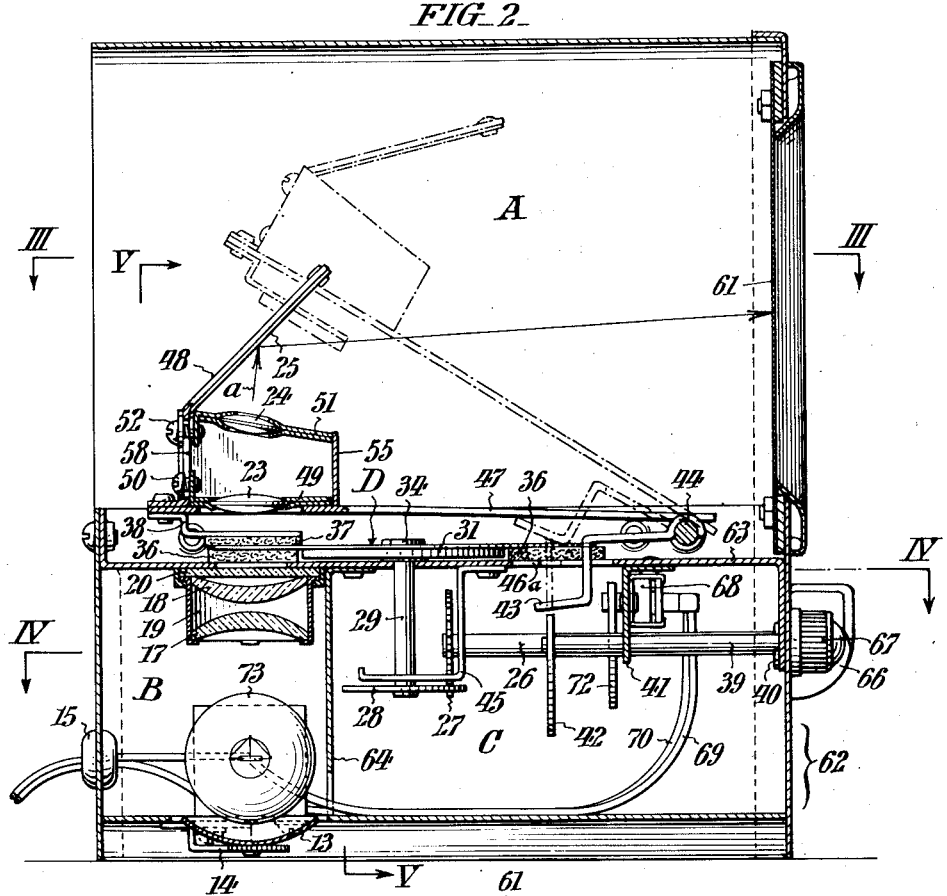
INVENTOR:
James J. Dilks,
BY Paul & Paul
ATTORNEYS.

Oct. 9, 1951                    J. J. DILKS                    2,570,652
                        PICTURE DISK VIEWING PROJECTOR
Filed May 4, 1949                                          3 Sheets-Sheet 3
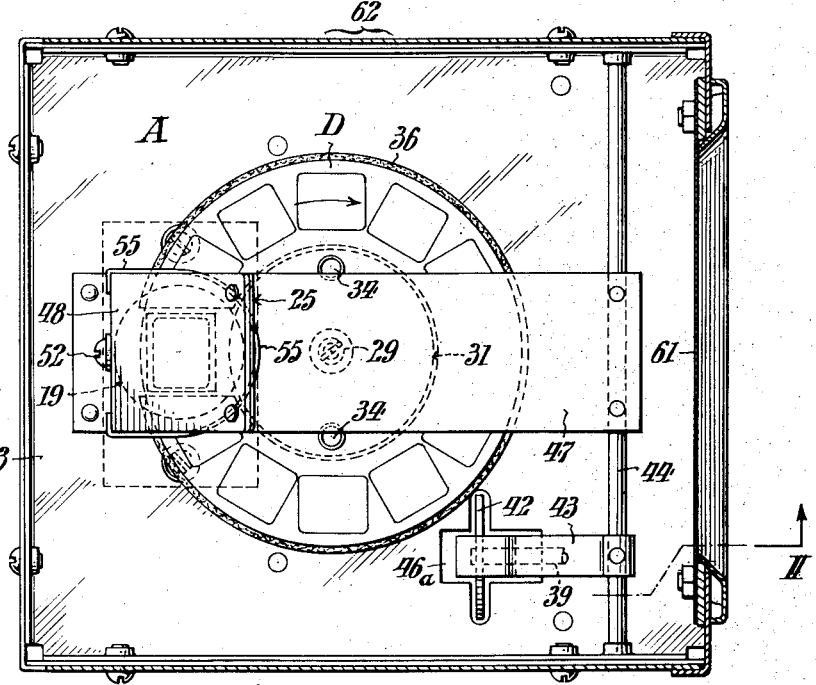
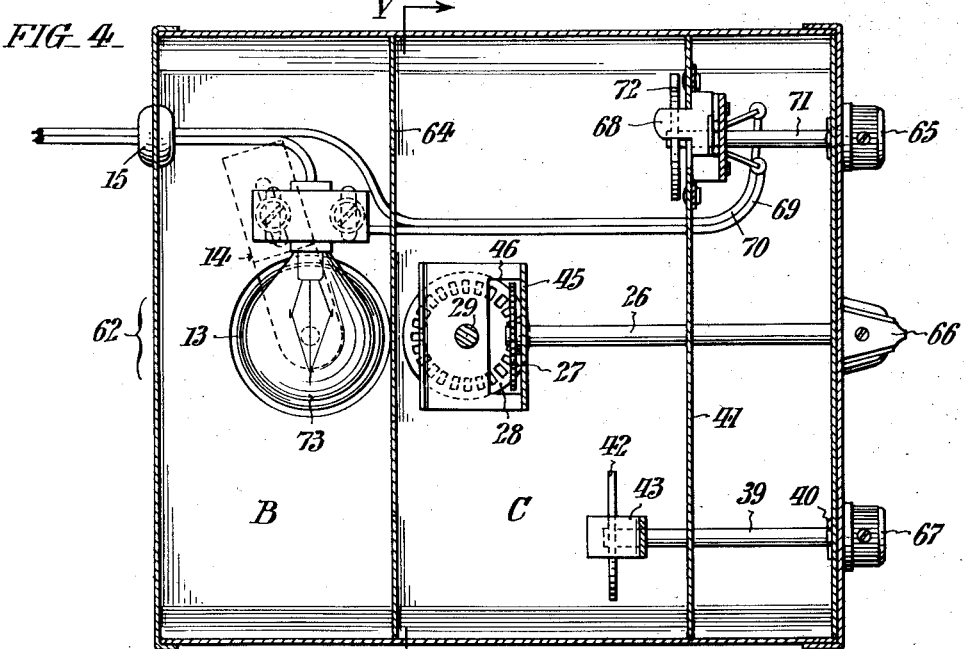
WITNESSES                                              INVENTOR:
                                                       James J. Dilks,
                                            BY
                                                       ATTORNEYS.

Patented Oct. 9, 1951

2,570,652

UNITED STATES PATENT OFFICE 2,570,652

PICTURE DISK VIEWING PROJECTOR

James J. Dilks, Haddon Heights, N. J.

Application May 4, 1949, Serial No. 91,259

4 Claims. (Cl. 88—27)

This invention relates to a film viewing apparatus, and more particularly to a manually operated apparatus in the nature of a toy or entertainment device, for projection and viewing of images from a series of pictures on a film disk.

In my U. S. Patent No. 2,227,071 I have described a picture film viewing apparatus for viewing images from disks having annularly or spirally arranged pictures. While my prior apparatus is well suited to many different uses it is not particularly designed for play and experimentation by children, nor is it adapted to be manufactured at a low cost comparable to that of the present invention.

It is an object of this invention to provide a film viewing apparatus in the form of an imitation television set primarily for use of children for their education or entertainment. It is a further object to provide a durable low-cost picture projector in which films are easily changed and focus is rapidly adjusted. A still further object is to provide a picture projector and viewer capable of projecting images from films of widely varying thickness.

Other objects and advantages of the invention, including the benefits derived from simplicity of construction whereby the various elements may be economically manufactured and readily assembled into a compact unit and yet function efficiently to produce images upon a screen, will become more fully apparent from the description of one embodiment of the invention which follows hereinafter, having reference to the accompanying drawings.

Of the drawings:

Fig. 1 is a front view of the film viewing apparatus of this invention;

Fig. 2 is a staggered vertical section of the film viewing apparatus, taken along the lines II—II as indicated in Figs. 1 and 3;

Fig. 3 is a horizontal sectional view of the same, taken along the lines III—III as indicated in Figs. 1 and 2;

Fig. 4 is a horizontal sectional view of the same taken along the lines IV—IV in Fig. 2;

Fig. 5 is a fractional vertical section taken along the lines V—V in Figs. 2 and 4; and Fig. 6 is an enlarged plan view of a film disk as used in my apparatus.

As shown in the drawings the illustrated embodiment of this invention comprises a box-shaped casing 62 which has a viewing screen 61 screwed to the front thereof and is interiorly divided by a horizontal partition 63 and a vertical partition 64 into one upper and two lower compartments, designated respectively at A, B and C. The upper compartment A is open at the rear so that the operator may have ready access thereto. The casing 62 and its partitions 63 and 64 are desirably constructed of sheet metal, the parts being joined together by nuts and bolts.

Exteriorly mounted on the front of the casing below the viewing screen 61, see Fig. 1, are three manually operated elements, one being a switch dial 65 which closes and opens an electrical circuit to energize or de-energize the source of illumination; another being a picture selector dial 66 which governs the rotation of the film disc D from which images are projected to the screen 1; and the third being a focusing knob 67.

Switch dial 65 is mounted on a shaft 71 which extends into compartment C and carries at its inner end a notched disc 72, shown most clearly in Fig. 5, the rotation of which causes a conventional snap switch 68 to be moved to one position or another. Switch 68 is in circuit with wires 69 and 70, one of which is connected across the terminals of a lamp 73 in compartment B which constitutes the source of illumination.

The wires 69 and 70 pass through an insulated aperture 15 in the casing to the exterior thereof and are connected to a suitable source of electrical energy, not shown. A parabolic reflector 13 is adjustably supported by a bracket 14 which is attached to the bottom of the casing 62. As shown in Figs. 2 and 4, the concave surface of the reflector 13 is faced upwardly concentrating part of the light from the source into a vertical beam. The light passes through a system of condensing lenses 17 and 18, see Fig. 2, the lenses being aligned and supported within a tube 19. A flat glass sheet 20 is positioned horizontally at the top of the condensing unit. The rays of light then pass through an aperture in the horizontal partition 63 and through a film D in compartment A. Film D lies in compartment A between felt pads 36 and 37 which cooperate to level the film for accurate formation of an image without distortion. The light rays then pass through projecting lenses 23 and 24 to a mirror 25 from which the image is reflected onto the screen 61.

Picture selector dial 66 is adapted to assume any one of twelve different positions as numbered on the front of the apparatus, each corresponding to one of the twelve pictures of the film disk D. It is mounted on a shaft 26 which passes through an aperture in the front wall of the casing and is supported by an angular lug 45 depending from the horizontal partition 63. Gear 27 affixed to shaft 26 meshes with gear 28 to drive shaft 29 which is journaled at its lower end in lug 45. Lug 45 is slotted at 46, as shown in Fig. 4, to accommodate gear 27. Shaft 29 is secured at its upper end to turntable 31. The turntable 31 is rotated by twisting picture selector dial 66. As shown in Fig. 2, the film disk D lies flat on turntable 31 and is provided with an aperture at its center and two spaced apertures 32 which are penetrated by upstanding diametrically arranged studs 34. The position of the film disk D with respect to the turntable 31 is therefore fixed and any motion of the turntable is transmitted to the disk through studs 34.

As appears in Figs. 2 and 5 the film disk D is kept flat in the vicinity of the sector penetrated by light rays by means of felt pads 36 and 37 between which the film slides. Lower pad 36 is ring-shaped extending substantially around the turntable 31 but is provided with an opening above lens 18 for passage of light. It is affixed to the partition 63 by means of an adhesive. Lower pad 36 supports film disk D at its outer periphery but does not revolve as does the film. Upper felt pads 37 are affixed to the under side of legs 38 attached to a pivotally mounted support 47.

Focusing knob 67 is affixed to a shaft 39 which passes through an aperture in the front of casing 62. Shaft 39 is held against axial movement with respect to the casing by means of a pin 40 and is supported at its inner end by a plate 41 attached to the underside of horizontal partition 63. Attached to the end of shaft 39 is a cam 42 which consists of a substantially circular piece of sheet material eccentrically affixed to shaft 39. Cam follower 43 is rigidly secured to shaft 44 and passes through aperture 48a in the horizontal portion 63, see Fig. 3, so that it may engage cam 42. Shaft 44 is supported at its ends in bearings at the sides of the projector casing, and is revolved as the result of the rotary movement of the cam 42.

Affixed to shaft 44 is the support 47 which carries the entire means for projecting the image from the film disk D to the screen 61. Support 47 extends rearwardly over the turntable 31. It has mounted on its free end an upstanding bracket 48 having a base portion, slotted at 58 to receive screws 50, 52 which serve as an adjustable means for attaching lens holders 49 and 51. The lens holders 49 and 51 surround and support the circular edges of projecting lenses 23 and 24 respectively, and by means of the screws 50, 52 these lenses may be spaced from each other and from the film disk D as desired.

The upstanding bracket 48 is inclined upwardly and forwardly towards the screen at an angle of approximately 45 degrees commencing at a point near its juncture with lens holder 51 and furnishes a support for a reflecting mirror 25 which is attached thereto. A shield 55 forms with the base portion of the bracket 48 a housing surrounding the projecting lenses 23, 24, and thus the light beam from the lamp 73 is confined and directed in its path to the mirror 25.

By turning the focusing knob 67 the operator of the device actuates cam 42 which contacts the bottom surface of cam follower 43 to swing the entire projector lens housing upwardly or downwardly. When cam 42 is turned through an angle of 180°, from the position shown in which it is represented in Fig. 5, the pivotal support 47 carrying the projector lens housing is raised to the position shown in dot-and-dash lines in Fig. 2. The edge of cam 42 may be flattened as indicated at 57 in Fig. 5, the flat edge of the cam cooperating with the flat under surface of the follower 43 to provide a means for holding the support 47 in a fully raised position. Furthermore, shaft 39 may have such frictional engagement with the bearings in which it is supported that the support 47, which is of light construction, may be held in any intermediate position as the focusing knob 7 is turned.

The focus of the image on the screen 61 may be varied by rotation of the focusing knob 67 to change the vertical positions of both projecting lenses 23 and 24 by raising and lowering support 47 or by varying their positions with respect to each other by means of adjusting screws 50 and 52. The film disks D are readily applied and removed and when mounted on the turntable 31 are centered and positively driven by virtue of the engagement of the studs 34 with the spaced circular openings 32 of the film disks. If it is desired to have both hands free during the change of film disks, focusing knob 67 may be turned, raising the lens housing to its uppermost position. The engagement of flat cam surface 57 with lever surface 43 holds the lens housing in its raised position without requiring external control, freeing the hands of the operator. Ready access may be had by the operator to the turntable 31 for changing of film disks inasmuch as compartment A is entirely open at the rear thereof.

The provision of a unitary hinged support 47 carrying film levelling and depressing pads, projecting lenses and mirror is particularly advantageous. The entire unit is conveniently lifted and swung clear of the turntable for withdrawal and insertion of film disks, and the weight of the entire unit cooperates with the felt pads at its base to flatten and depress the disk as it slides across the condensed light beam. This assures an accurate reproduction of the film image on the screen, and avoids the distortion encountered when a film is not flattened accurately. The unitary structure assures a fixed positional relationship between projecting lens and mirror and also renders the apparatus adaptable for use with films of widely varying thickness. For example, films permanently sealed between thick glass slides may be projected in alternation with thin uncovered films in my projecting device by simply raising the entire support for the projecting lens-mirror unit and causing it to rest on the different films.

The pivotal support also permits a substantial change of focus without projecting the image away from the center of the screen. This advantage results in part from the provision of a mirror at an angle to the principal axis $a$ of convex lens 24 and retaining the convex lens in fixed position with respect to the mirror on the pivotal support. As the pivotal support 47 is raised, the change of mirror angle with respect to the screen is compensated in part at least by a change of alignment of lenses 18 and 24, with the result that the pivotal support may be lifted through an angle as great as 30° and above without substantially displacing the projected image from the center of viewing screen 1.

While I have described my invention with reference to one specific embodiment thereof, it will be apparent to those skilled in the art that various changes may be made in the form of the apparatus, that equivalent elements or mechanisms may be substituted for those specifically illustrated in the accompanying drawings, and that certain features of the invention may at times be used to advantage without the use of other features, all without departing from the spirit of the invention as defined in the annexed claims.

Having thus described my invention, I claim:

1. A film viewing apparatus comprising a casing with a viewing screen at one side thereof, a source of illumination forming a light beam within said casing, a condensing lens aligned with and penetrated by said light beam, a turntable within said casing for carrying a film disk with annularly arranged pictures, the movement of said turntable serving to bring said pictures successively into the path of said light beam above said condensing lens, a support pivotally mounted within the casing above the turntable and adapted to be swung clear of the turntable for changing film disks, means carried by said support, including a projecting lens positioned in the path of the light beam, for projecting an image to the screen, a cam having operative contact with a member constituting a part of said pivotal support, and means including a manually operated element mounted exteriorly of said casing for rotating said cam to effect small changes in the relative positions of said support and turntable to vary the distance between said condensing lens and projecting lens and thereby focus the image on the screen.

2. Film viewing apparatus comprising a source of illumination forming a light beam, a turntable constructed to carry a film disk therethrough, a condensing lens in said light beam intermediate said source and film disk, a pivotally mounted support extending above said turntable and adapted to be swung upwardly through an arcuate path about its pivot clear of the turntable for changing film disks, an image projecting lens carried by said support and disposed in the path of said light beam above said film disk, manually controllable mechanical means in the form of a rotatable cam having operative contact with the support, and means for rotating said cam to swing the support through a small arc about its pivot effecting relatively small changes in distance between said condensing lens and projecting lens, thereby focusing the image emanating from the projecting lens, and also to effect further rotation of said cam thereby swinging said support upwardly in said arcuate path clear of the turntable for changing film discs.

3. Film viewing apparatus comprising a source of illumination forming a light beam, a turntable constructed to carry a film disk therethrough, a condensing lens in said light beam intermediate said source and film disk, a pivotally mounted support extending above said turntable and adapted to be swung upwardly clear of the turntable for changing film disks, an image projecting lens carried by said support and disposed in the path of said light beam above said film disk, a cam follower carried by said support, said cam follower having a flat surface, and manually controllable mechanical means in the form of a cam positioned for contact with the follower for swinging the support about its pivot to effect small changes in distance between said condensing lens and projecting lens, and thereby focus the image emanating from the projecting lens, said cam having a flat portion adapted to fit against the flat surface of the follower when the support is raised, thereby maintaining the support in raised position.

4. A film viewing apparatus comprising a casing with a viewing screen at one side thereof, a source of illumination forming a light beam within said casing, a condensing lens aligned with and penetrated by said light beam, a turntable within said casing for carrying a film disk with annularly arranged pictures, the movement of said turntable serving to bring said pictures successively into the path of said light beam above said condensing lens, a support pivotally mounted within the casing above the turntable and adapted to be swung clear of the turntable for changing film disks, means carried by said support, including a projecting lens positioned in the path of the light beam, for projecting an image to the screen, a cam follower on said support, said cam follower having a flat surface, a cam positioned for contact with said follower, and means including a manually operated element mounted exteriorly of said casing for rotating said cam to effect small changes in the relative positions of said support and turntable to vary the distance between said condensing lens and projecting lens and thereby focus the image on the screen, said cam having a flat portion adapted to fit against the flat surface of the follower when the support is raised, thereby maintaining the support in raised position.

JAMES J. DILKS.

REFERENCES CITED

The following references are of record in the file of this patent:

UNITED STATES PATENTS

| Number | Name | Date |
|---|---|---|
| 1,210,316 | Hollingshead | Dec. 26, 1916 |
| 1,381,849 | Sandell | June 14, 1921 |
| 1,537,654 | Nash | May 12, 1925 |
| 1,620,768 | Joy | Mar. 15, 1927 |
| 1,680,619 | Isbills | Aug. 14, 1928 |
| 2,128,409 | Hager | Aug. 30, 1938 |
| 2,186,753 | Dilks | Jan. 9, 1940 |
| 2,311,056 | Langberg | Feb. 16, 1943 |
| 2,374,981 | Cooke | May 1, 1945 |